(12) United States Patent
Pirvu et al.

(10) Patent No.: US 10,346,157 B2
(45) Date of Patent: Jul. 9, 2019

(54) PATCH INFRASTRUCTURE FOR ROM FIRMWARE

(71) Applicant: QUALCOMM Incorporated, San Diego, CA (US)

(72) Inventors: Eugen Pirvu, Mission Viejo, CA (US); Dhaval Patel, San Diego, CA (US); Dhamim Packer Ali, San Diego, CA (US); Bhargav Gurappadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/664,012

(22) Filed: Jul. 31, 2017

(65) Prior Publication Data

US 2019/0034196 A1 Jan. 31, 2019

(51) Int. Cl.
*G06F 8/30* (2018.01)
*G06F 8/65* (2018.01)

(52) U.S. Cl.
CPC ............ *G06F 8/66* (2013.01); *G06F 8/30* (2013.01); *G06F 8/65* (2013.01)

(58) Field of Classification Search
CPC ............ G06F 8/66; G06F 8/30; G06F 8/65
USPC ...................................................... 717/171
See application file for complete search history.

(56) References Cited

U.S. PATENT DOCUMENTS

| 7,472,380 | B1* | 12/2008 | Rao | G06F 8/65 |
| | | | | 717/140 |
| 7,596,721 | B1* | 9/2009 | Flake | G06F 8/66 |
| | | | | 714/42 |
| 7,669,197 | B1* | 2/2010 | O'Neill | G06F 8/658 |
| | | | | 717/172 |

(Continued)

FOREIGN PATENT DOCUMENTS

ES 2601502 T3 * 2/2017 ............... G06F 8/65

OTHER PUBLICATIONS

Stüttgen et al., "Acquisition and analysis of compromised firmware using memory forensics", 2015, Elsevier Ltd (Year: 2015).*

(Continued)

*Primary Examiner* — Wei Y Zhen
*Assistant Examiner* — Junchun Wu
(74) *Attorney, Agent, or Firm* — The Marbury Law Group/Qualcomm

(57) ABSTRACT

Various aspects include methods for implementing a firmware patch infrastructure. Various aspects may include identifying a patchable object from a firmware source code image based on a symbol in the patchable object's name, generating a patchable firmware source code file by injecting a first call to the patchable object configured to call to an indirection table and a second call to the patchable object configure to execute the patchable object, building a patchable firmware source code image from a plurality of patchable firmware source code files including the patchable firmware source code file having the first call to the patchable object and the second call to the patchable object, and (Continued)

creating the indirection table including an entry for the first call from the patchable firmware source code image having an indication to implement the second call in the patchable firmware source code image.

24 Claims, 14 Drawing Sheets

(56) References Cited

U.S. PATENT DOCUMENTS

| | | | |
|---|---|---|---|
| 7,797,696 B1* | 9/2010 | Nallagatla | G06F 8/65 717/168 |
| 7,984,432 B2 | 7/2011 | Edlund | |
| 8,245,214 B2 | 8/2012 | Long et al. | |
| 8,689,204 B2 | 4/2014 | Kreek et al. | |
| 9,003,372 B2* | 4/2015 | Stella | H04L 63/0428 717/170 |
| 9,348,730 B2* | 5/2016 | Odlivak | G06F 11/3644 |
| 9,626,179 B2 | 4/2017 | Shahar | |
| 9,641,406 B1* | 5/2017 | Allen | G06F 8/65 |
| 2003/0131083 A1* | 7/2003 | Inui | G06F 8/65 709/221 |
| 2004/0040019 A1* | 2/2004 | Ha | G06F 8/65 717/168 |
| 2004/0062166 A1* | 4/2004 | Tanimukai | G06F 8/65 369/53.37 |
| 2005/0177709 A1* | 8/2005 | Kim | G06F 8/65 713/1 |
| 2006/0080648 A1* | 4/2006 | Anwar | G06F 9/44521 717/163 |
| 2007/0038801 A1* | 2/2007 | Tanaka | G06F 8/65 711/103 |
| 2007/0079306 A1* | 4/2007 | Qumei | G06F 8/658 717/168 |
| 2007/0150715 A1* | 6/2007 | Rothman | G06F 8/65 713/1 |
| 2010/0223602 A1* | 9/2010 | Kreek | G06F 8/64 717/168 |
| 2011/0143661 A1 | 6/2011 | Hartwig et al. | |
| 2014/0136856 A1* | 5/2014 | Flynn | G06F 9/4406 717/168 |
| 2014/0344799 A1* | 11/2014 | Thodati | G06F 8/654 717/171 |
| 2016/0202964 A1* | 7/2016 | Butcher | G06F 8/65 717/172 |
| 2017/0090909 A1* | 3/2017 | Guo | G06F 8/66 |

OTHER PUBLICATIONS

Wang et al., "Detecting Firmware Modifications in Embedded Systems using Hardware Performance Counters", 2015, IEEE (Year: 2015).*

Basnight et al., "Firmware modification attacks on programmable logic controllers", 2013, Elsevier Ltd (Year: 2013).*

Zuhayri et al., "Unified Extensible Firmware Interface: An Innovative Infrastructure for Power/Thermal Autonomics", 2010, IEEE (Year: 2010).*

Partial International Search Report—PCT/US2018/041762—ISA/EPO—dated Oct. 24, 2018, 16 pages.

International Search Report and Written Opinion—PCT/US2018/041762—ISA/EPO—dated Dec. 19, 2018.

* cited by examiner

PATCH INFRASTRUCTURE FOR ROM FIRMWARE

BACKGROUND

Many mobile/automotive/server/compute market chips store part of the firmware image in read only memory (ROM) instead of other non-volatile memory. Primary reasons for this approach are lower costs because ROM is less expensive than equivalent static RAM (SRAM) from both die size and power perspectives, and security concerns because ROM is tamper proof. However, storing firmware in ROM means that large sections of the firmware code cannot be modified to fix bugs or to offer more configurability after completion of hardware design and commercialization. A current solution to modifying ROM stored code is to use programmable ROM (PROM), which limits patching to only a few tens of bytes of instructions. PROM requires factory programming and rollout during/after production, increasing manufacturing overhead.

SUMMARY

Various disclosed aspects may include apparatuses and methods for implementing a patch infrastructure on a computing device for firmware stored in read only memory (ROM) on a remote receiving computing device. Various aspects may include identifying a patchable object from a firmware source code image based on a symbol designated to indicated a patchable object in a name of the patchable object, generating a patchable firmware source code file by injecting source code including a first call to the patchable object configured to call to an indirection table and a second call to the patchable object configure to execute the patchable object, building a patchable firmware source code image from a plurality of patchable firmware source code files including the patchable firmware source code file, in which the patchable firmware source code image includes the first call to the patchable object and the second call to the patchable object, and creating the indirection table including an entry for the first call to the patchable object from the patchable firmware source code image having an indication to implement the second call to the patchable object in the patchable firmware source code image.

Some aspects may further include identifying a patch object from an update firmware source code image based on a symbol designated to indicate a patch object in a name of the patch object, in which the patch object corresponds to the patchable object, and updating the entry for the first call to the patchable object in the indirection table by replacing the indication to implement the second call to the patchable object with an indication to implement a call to the patch object.

Some aspects may include building the update firmware source code image from at least one update firmware source code file having the patch object, and building a patch firmware source code image from the at least one update firmware source code file and the updated indirection table, in which the patch firmware source code image includes the call to the patch object.

Some aspects may include sending a firmware update of the patchable firmware source code image including the indirection table and the patch firmware source code image to the remote receiving computing device.

In some aspects, sending a firmware update may include sending the firmware update as an over the air (OTA) update.

In some aspects, replacing the indication to implement the second call to the patchable object with an indication to implement a call to the patch object may include replacing the indication to implement the second call to the patchable object from the ROM with an indication to implement the call to the patch object from a random access memory of the remote receiving computing device. In some aspects, the indication to implement the second call to the patchable object in the patchable firmware source code image may include one of an address for the patchable object in the ROM or an instruction to implement the patchable object from the ROM, and the indication to implement the call to the patch object from the random access memory of the remote receiving computing device may include one of an address for the patch object in the random access memory or an instruction to implement the patch object from the random access memory.

Some aspects may further include generating a firmware source code file including a third call to the patchable object, and building, by the processor, the firmware source code image from a plurality of firmware source code files including the firmware source code file.

Various disclosed aspects may include apparatuses and methods for implementing a firmware update for a patchable firmware source code image stored in read only memory (ROM) on a computing device. Various aspects may include receiving a firmware update for the patchable firmware source code image including a patch indirection table and a patch firmware source code image, loading the patch indirection table and the patch firmware source code image to a random access memory of the computing device.

Some aspects may further include storing the patch indirection table and the patch firmware source code image to a non-volatile memory of the computing device, in which loading the patch indirection table and the patch firmware source code image to a random access memory of the computing device may include loading the patch indirection table and the patch firmware source code image from the non-volatile memory.

Some aspects may further include executing the patchable firmware source code image including executing a first call to a patchable object having a call to the patch indirection table, retrieving an entry of the patch indirection table associated with the patchable object, and determining whether the entry includes an indication to execute a call to a patch object from the random access memory.

Some aspects may further include accessing the patch object in the random access memory in response to determining that the entry includes an indication to execute the call to the patch object, and executing the patch object.

Some aspects may further include accessing a second call to the patchable object in the ROM in response to determining that the entry does not include an indication to execute the call to the patch object, and executing the second call to the patchable object.

In some aspects, the indication to execute the call to the patch object from the random access memory may include one of an address for the patch object in the random access memory or an instruction to implement the patch object from the random access memory, and the entry includes an indication to execute a second call to the patchable object in the patchable firmware source code image when the entry does not include the indication to execute the call to the patch object from the random access memory, in which the indication to execute the second call to the patchable object may include one of an address for the patchable object in the ROM or an instruction to implement the patchable object from the ROM.

In some aspects, receiving the firmware update for the patchable firmware source code image may include receiving the firmware update as an over the air (OTA) update.

Various aspects include computing devices having a random access memory configured to store a patch indirection table and a patch firmware source code image, and a processor configured to perform operations of any of the methods summarized above. Various aspects include computing devices having means for performing functions of any of the methods summarized above. Various aspects include a processor readable storage medium on which are stored processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
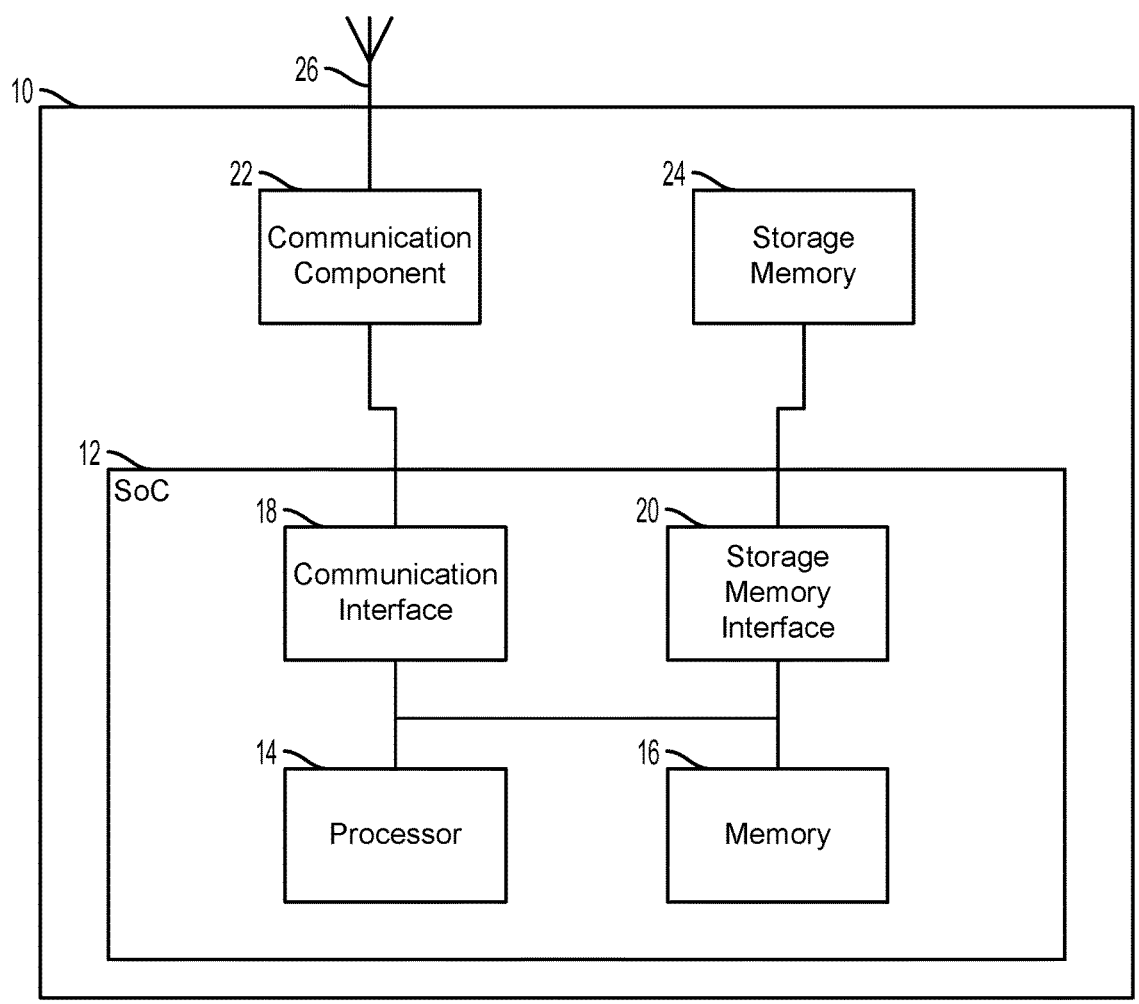
FIG. 1 is a component block diagram illustrating a computing device suitable for implementing various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects include methods, and computing devices implementing such methods for implementing a mechanism to patch code in read only memory (ROM) that retains debug symbol compatibility and is agnostic to central processing unit (CPU)/compiler generated code. The apparatus and methods of the various aspects may include injecting patchable code into firmware source code files and building a final patchable firmware code for storage in a read only memory from patchable firmware source files. Various aspects may include patchable firmware code in the read only memory configured to redirect all calls to the patchable firmware code in the read only memory via a generated indirection table to original firmware code in the read only memory and/or patched firmware code in random access memory.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The terms "computing device" and "mobile computing device" may further refer to Internet of Things (IoT) devices, including wired and/or wirelessly connectable appliances and peripheral devices to appliances, décor devices, security devices, environment regulator devices, physiological sensor devices, audio/visual devices, toys, hobby and/or work devices, IoT device hubs, etc. The terms "computing device" and "mobile computing device" may further refer to components of personal and mass transportation vehicles. The term "computing device" may further refer to stationary computing devices including personal computers, desktop computers, all-in-one computers, workstations, super computers, mainframe computers, embedded computers, servers, home media computers, and game consoles.

Once a ROM is configured with firmware code, the firmware code stored in the read only memory cannot be modified. Various aspects provide methods for enabling patchable firmware code stored in ROM to allow for bug fixes and/or feature updates without having to change the firmware code in the ROM. Various aspects include generating patchable firmware code for the ROM that calls to an indirection table for patchable objects in the firmware code in the ROM. The indirection table may direct execution of the patchable firmware code to executable original firmware code in the ROM and/or patch firmware code in a random access memory.

Firmware source code may be generated with an indication that the firmware source code is patchable. For example, an application program interface (API) may be created or modified to include patchable objects, which may be specified in patchable libraries. Inclusion in the patchable libraries may be used to identify an object as a patchable object. Using the firmware source code, a firmware source code image may be generated, which may normally be used to configure a ROM with non-patchable firmware code. The firmware source code image may be analyzed for firmware code that is indicated as patchable. For example, a symbol may be used to identify a patchable object in the firmware source code image. Patchable firmware source code may be generated to replace the firmware source code that may include the firmware code that is indicated as patchable with firmware source code that enables patching of the firmware code. A call to an indirection table for each call of a patchable object in the firmware source code may be added to the firmware source code to generate the patchable firmware source code. Further, the patchable object may be renamed in the patchable firmware source code to identify the patchable object in the patchable firmware code in the ROM for calls from the indirection table, and to differentiate the patchable object in patchable firmware code in the ROM from patch firmware code stored in the random access memory.

Using the patchable firmware code, an initial indirection table may be generated. The indirection table may be code based and/or data based. A code based indirection table may include a call to either the patchable object in the patchable firmware code in the ROM or a call to the patch firmware code stored in the random access memory. A data based indirection table may include an address of the original firmware code in the ROM or an address for the patch firmware code stored in the random access memory.

Patch firmware source code may be generated using identifiers for patch objects, patchable objects that may be modified for a current iteration of the firmware source code. An instance of the patch object may include an identifier in its name. An update firmware code may be generated for updating the patchable firmware source code in the ROM and used to build an update firmware source code image. The update firmware source code image may be analyzed for objects that are indicated as a patch objects. A symbol file may be used to identify a patch object in the update firmware source code image. The indirection table may be updated as the patch indirection table by changing calls to and/or indications to use the original object in the patchable firmware code in the ROM to calls to and/or indications to use a patch object in the random access memory.

To update the patchable firmware code in a ROM on a computing device, the computing device may store the patch indirection table and the patch firmware code to a non-volatile memory for loading to a random access memory. The patch indirection table and the patch firmware code in the random access memory may be used to supplement the patchable firmware code in the ROM.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
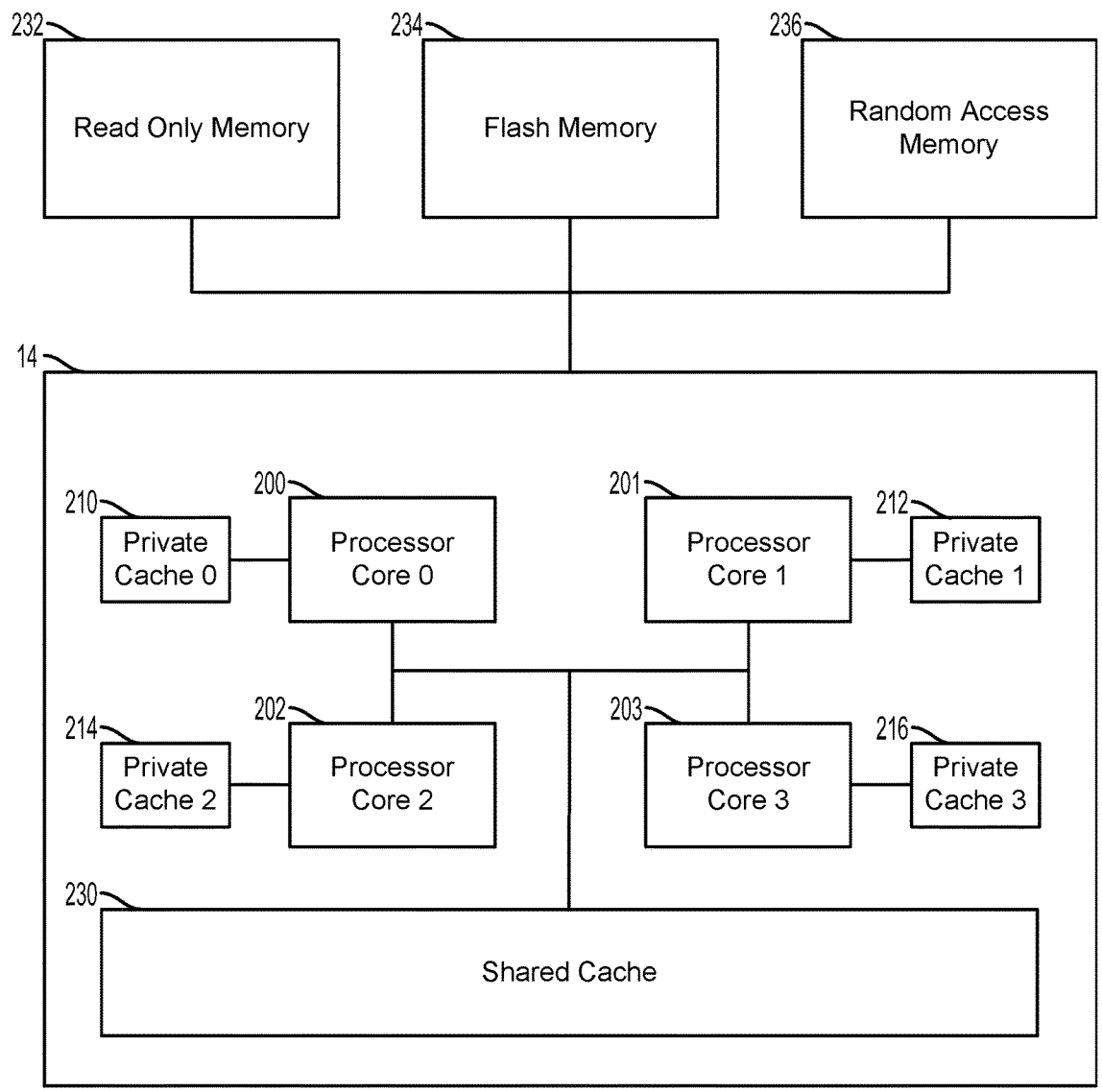
FIG. 2 is a component block diagram illustrating components of a computing device suitable for implementing various aspects.

FIG. 2 illustrates components of a computing device suitable for implementing an aspect. A processor 14 may include multiple processor types, including, for example, a CPU and various hardware accelerators such as a GPU, a DSP, an APU, subsystem processor, etc. The processor 14 may also include a custom hardware accelerator, which may include custom processing hardware and/or general purpose hardware configured to implement a specialized set of functions. The processors 14 may include any number of processor cores 200, 201, 202, 203. A processor 14 having multiple processor cores 200, 201, 202, 203 may be referred to as a multicore processor.

The processor 14 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 14 may be configured for the same purpose and have the same or similar performance characteristics. For example, the processor 14 may be a general purpose processor, and the processor cores 200, 201, 202, 203 may be homogeneous general purpose processor cores. The processor 14 may be a GPU or a DSP, and the processor cores 200, 201, 202, 203 may be homogeneous graphics processor cores or digital signal processor cores, respectively. The processor 14 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous processors 14. In various aspects, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The processor 14 may further include a shared cache 230 that may be configured to read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the processor 14. The shared cache 230 may include volatile memory as described herein with reference to memory 16 of FIG. 1.

In the example illustrated in FIG. 2, the processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the processor 14 may individually or in combination include fewer or more than the four processor cores 200, 201, 202, 203 and private caches 210, 212, 214, 216 illustrated and described herein.

The processor 14 may also be communicatively connected to a combination of volatile and non-volatile memory devices that are included on and/or separate from an SoC, such as a ROM 232, a flash memory 234, and/or a random access memory RAM 236 (any combination of which may be part of the memory 16 in FIG. 1). The ROM 232 may be a non-volatile and/or non-programmable memory. The ROM 232 may be configured to store a basic input/output system (BIOS), a primary boot loader (PBL), and/or other firmware for the computing device and/or subsystem of the computing device that may be the code used for booting up the computing device, for loading higher level code and functionalities, such as those of a firmware, an operating system, and/or other software program, and/or for implementing programmable device functionality and control. The ROM 232 may be configured so that code stored on the ROM 232 cannot be altered without specific equipment and/or without replacing the ROM 232. The protection of the code stored on the ROM 232 ensures that the code will not be corrupted.

The flash memory 234 may be a non-volatile and/or programmable memory. The flash memory 234 may be configured to store firmware updates, including code and/or data, for programmable hardware components of the computing device. Firmware updates may be used by a manufacture of a computing device or of computing device components, a service provider, and/or a vendor to correct a bug in the firmware stored in the ROM 232 and/or to provide new and/or updated functionally and/or control of the programmable hardware of the computing device as defined in the firmware stored in the ROM 232. In various aspects firmware images of a firmware update may include altered versions of any number of the firmware images stored in the ROM 232. A firmware update may also include an indirection table that may be stored to the flash memory 234 and configured to guide the execution of a firmware between execution of the firmware images stored in the ROM 232 and/or the firmware update images, which may be stored in the flash memory 234 and loaded to a random access memory 236 for execution as described herein.

The random access memory 236 may be a volatile and/or programmable memory. The random access memory 236 may be configured to temporarily store the firmware images of a firmware update, while the random access memory 236 is powered, for access to the firmware images for execution of the firmware. The random access memory 236 may be configured to temporarily store the indirection table of a firmware update, while the random access memory 236 is powered, for access to the indirection table to guide the execution of a firmware between execution of the firmware images stored in the ROM 232 and/or the firmware update images stored in the random access memory 236.

The processor 14 may access each of the ROM 232, the flash memory 234, and/or a random access memory 236. The processor 14 may access the ROM 232 to retrieve and execute the BIOS, primary boot loader, and/or firmware stored in the ROM 232. The processor 14 may functionality and control of the computing device by executing the firmware stored in the ROM. The processor 14 may also may access the flash memory 234 to retrieve the firmware updates and indirection tables, and store the firmware updates and indirection tables to the random access memory 236. The processor 14 may also access the flash memory 234 to implement updates to the firmware in the flash memory 234 by storing the firmware updates and indirection table to the flash memory 234. The processor 14 may access the random access memory 236 to store, retrieve, and/or modify the firmware updates and/or indirection table to execute the functionality and control of the programmable hardware components of the computing device.

For ease of reference, the terms "hardware accelerator," "custom hardware accelerator," "multicore processor," "processor," and "processor core" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers, and may be located and connected differently within the SoC or separate from the SoC.

Figure 3A:
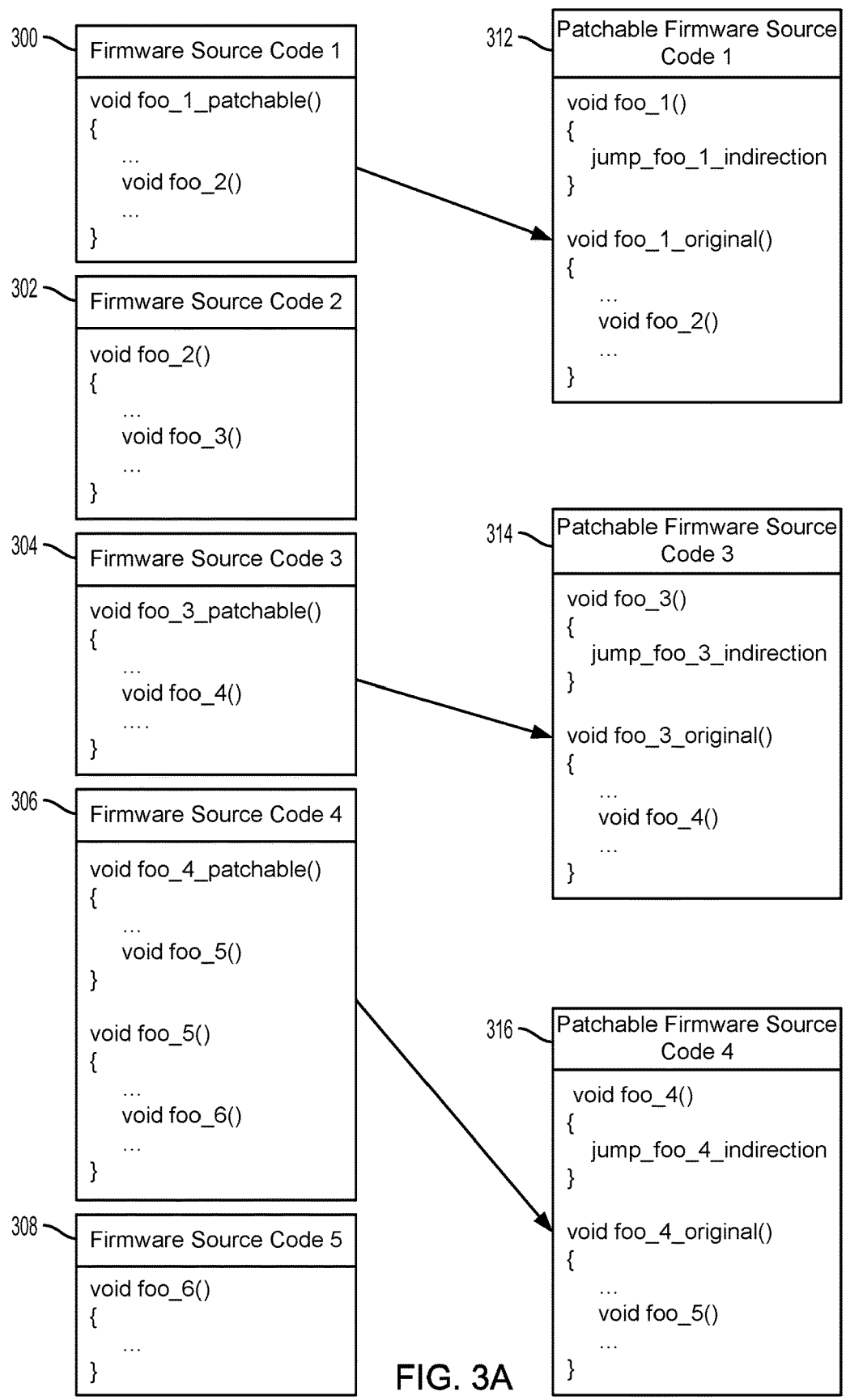
FIGS. 3A and 3B are block and flow diagrams illustrating an example conversion of firmware source code to patchable firmware source code for implementing various aspects.
Figure 3B:
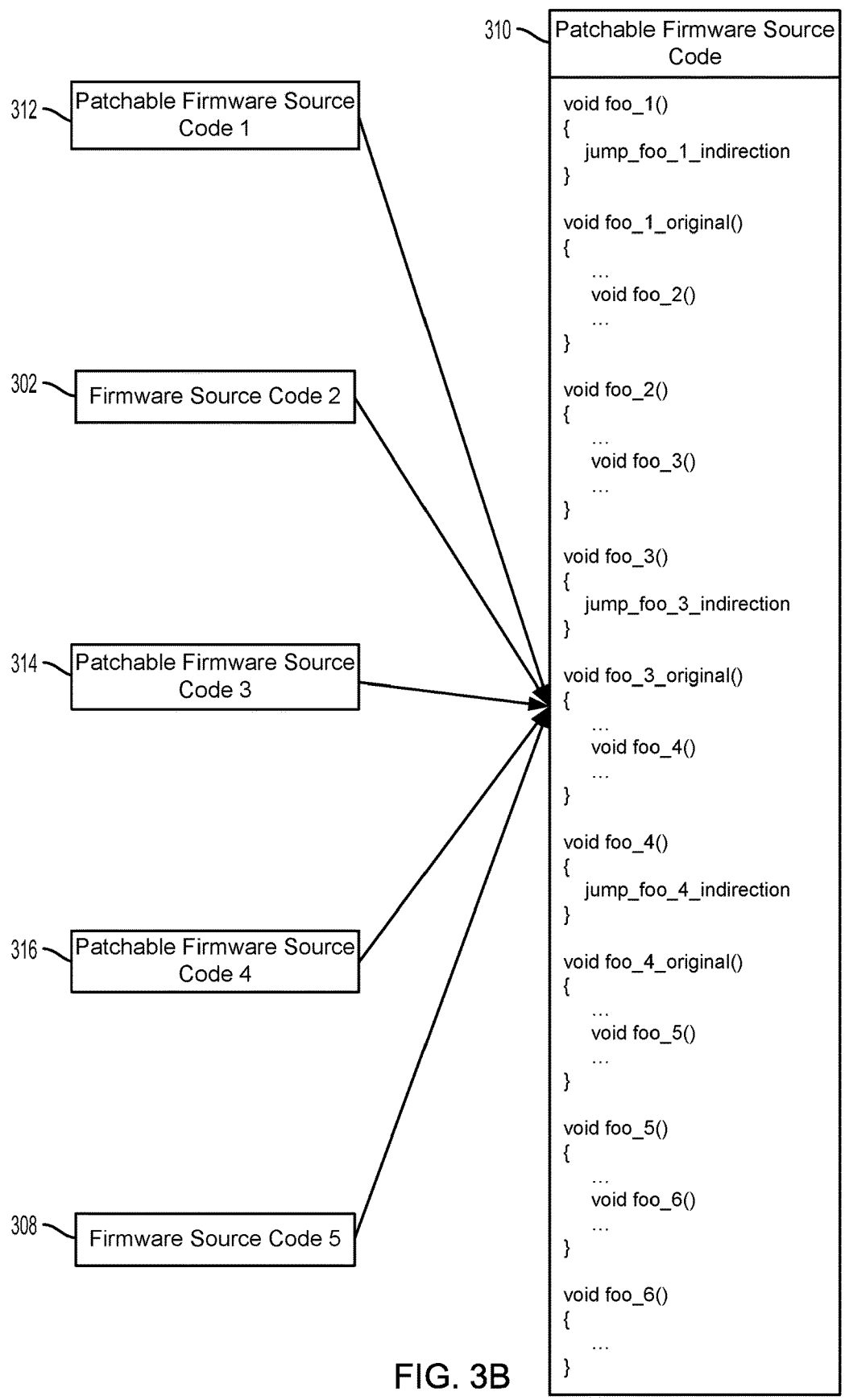

FIGS. 3A and 3B illustrate an example conversion of firmware source code to patchable firmware source code by implementing various aspects. Firmware stored in a ROM (e.g., ROM 232 in FIG. 2) may be generated from firmware source code files 300, 302, 304, 306, 308. Various firmware source code files 300, 302, 304, 306, 308 may be created for different purposes, such as for defining different functionalities and controls of a computing device (e.g., computing device 10 in FIG. 1), helping programmer organize the firmware code during development and maintenance of the firmware code, and for streamlining the firmware code by avoiding redundant code that may be written to and called from the various firmware source code files 300, 302, 304, 306, 308.

Once firmware code derived from the firmware source code files 300, 302, 304, 306, 308 is stored in the ROM, the firmware code cannot be altered in the ROM. The firmware source code files 300, 302, 304, 306, 308 may be developed to assist later updating of the firmware code stored in ROM by allowing for generation of patch firmware code to be executed instead of portions of the firmware code stored in the ROM. During development of the firmware code, the firmware source code files 300, 302, 304, 306, 308 may be written using patchable objects and patchable libraries that may provide indications in the firmware source code files 300, 302, 304, 306, 308 that portions of the firmware source code files 300, 302, 304, 306, 308 are capable of being patched/updated by implementation of alternative patch firmware code. Patchable code objects included in the patchable code libraries may include symbols in the names of the patchable objects that may be used to identify a patchable object. Any character and/or combination of characters included in the name of the patchable object that may be designated as a symbol used to identify a patchable object. In the example illustrated in FIG. 3A, the symbol designated for use to identify a patchable object is "_patchable". In the firmware source code 1 file 300, the "foo_1_patchable" object name indicates that the "foo_1_patchable" object is a patchable object. Similarly, the "foo_3_patchable" object name in the firmware source code 3 file 304 and the "foo_4_patchable" object name in the firmware source code 4 file 306 are also indicated as patchable objects. The "foo_2" object name in the firmware source code 2 file 302, the "foo_5" object name in the firmware source code 4 file 306, and the "foo_6" object name in the firmware source code 5 file 308 do not contain symbols indicating the code objects as patchable objects.

The firmware source code files 300, 302, 304, 306, 308 may be converted to a patchable firmware source code 310. A patchable firmware source code 310 may include code injected into the firmware source code of the firmware source code files 300, 302, 304, 306, 308 that include a patchable object. The injected code may include calls to an indirection table that maybe configured to guide execution of a firmware between a patchable firmware image stored in a ROM, derived from the patchable firmware source code 310, and patch firmware image stored in a random access memory (e.g., random access memory 236 in FIG. 2), derived from a patch firmware source code, as described further herein.

To convert the firmware source code files 300, 302, 304, 306, 308 to the patchable firmware source code 310, a firmware source code image may be generated by combining the firmware source code files 300, 302, 304, 306, 308 and/or generating code for executing the firmware source code files 300, 302, 304, 306, 308. The firmware source code image may represent an execution order of the firmware source code files 300, 302, 304, 306, 308. The firmware source code image may be analyzed to extract a list of patchable objects from the firmware source code image. In various aspects, extracting the list of patchable objects may be accomplished by identifying the patchable objects in the firmware source code image and adding the patchable objects to a list. Identifying the patchable objects may be accomplished by searching the names of the objects in the firmware source code image for symbols dedicated for indicating a patchable object. In various aspects, the symbols dedicated for indicating a patchable object may be provided in a symbol file from which the symbols may be read and used to direct the search for the symbols in the names of the objects in the firmware source code image.

For patchable objects identified in the firmware source code image, the firmware source code files 300, 302, 304, 306, 308 may be altered as patchable firmware source code files 312, 314, 316 and/or patchable firmware source code files 312, 314, 316 may be generated to include the injected code for the patchable object. The injected code may include calls to an indirection table and/or rename the object for directing execution of the firmware to the object in the firmware image stored in the ROM for an object that is not patched. In the example illustrated in FIG. 3A, the injected code in the patchable firmware source code file 1 312 may include the call to an indirection table:

```
void foo_1( )
{
        jump_foo_1_indirection
},
and a renamed version of the patchable object:
void foo_1_original( )
{
        ...
        void foo_2( )
        ...
}.
```

In this example, the "foo_1" patchable object may be called and execution of the command "jump_foo_1_indirection" may cause an executing processor (e.g., processor 14 in FIGS. 1 and 2) to check the indirection table for direction for implementing the "foo_1" patchable object. In various aspects, the "foo_1" patchable object may not be patched, and the indirection table may direct the executing processor to execute the "foo_1_original" object stored in the ROM. The code injected to the patchable firmware source code files 312, 314 may similarly include calls to the indirection table and/or renamed the objects.

The firmware source code files 302, 308 that do not include patchable objects, and the patchable firmware source code files 312, 314, 316 that include injected code for the patchable objects may be used to generate a patchable firmware source code image 310. The patchable firmware source code image 310 may be generated by combining the firmware source code files 302, 308 and the patchable firmware source code files 312, 314, 316, and/or by generating code for executing the firmware source code files 302, 308 and the patchable firmware source code files 312, 314, 316. The patchable firmware source code image 310 may represent an execution order of the firmware source code files 302, 308 and the patchable firmware source code files 312, 314, 316. The patchable firmware source code image 310 may be compiled and/or stored to a ROM of a computing device.

Figure 4:
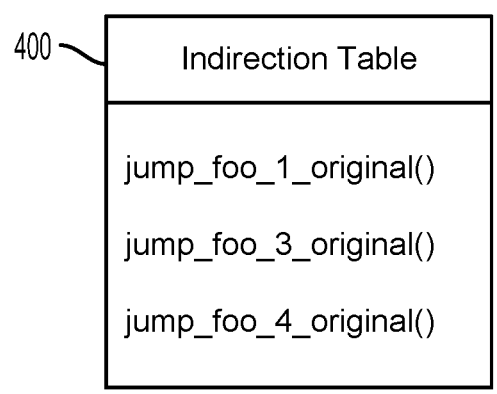
FIG. 4 is a block diagram illustrating an example indirection table for implementing various aspects.

FIG. 4 illustrates an example indirection table for implementing various aspects. An indirection table 400 may be generated using the patchable firmware source code image (e.g., patchable firmware source code image 310 in FIG. 3B). Each call to the indirection table 400 for a patchable object in the patchable firmware source code image may include an entry in the indirection table 400. In various aspects, the indirection table 400 may be code based, and each entry in the indirection table 400 may contain an instruction, such as a "jump" instruction to either the patchable object in the ROM (e.g., ROM 232 in FIG. 2) or the corresponding patch object in the random access memory (e.g., random access memory 236 in FIG. 2). In various aspects, the indirection table 400 may be data based, and each entry in the indirection table 400 may contain a designated data, such as zero (0), Null, or an address in the ROM, for the patchable objects that are not patched and an address in the random access memory for the patchable objects that are patched.

Continuing with the example illustrated in FIG. 3B, the example illustrated in FIG. 4 includes an indirection table 400 having entries for the call to the indirection table "jump_foo_1_indirection", "jump_foo_3_indirection", "jump_foo_4_indirection" in the patchable firmware source code image. The entries in the indirection table 400 may include calls to instances of the patchable objects. In various aspects, the indirection table 400 may be created for the patchable firmware source code image that may not have any patched objects, and the indirection table 400 may include calls to instances of the patchable objects in the patchable firmware source code image. The example illustrated in FIG. 4 includes calls "jump_foo_1_original( )", "jump_foo_3_original( )", and "jump_foo_4_original( )" to the renamed patchable objects "foo_1_original", "foo_3_original", and "foo_4_original" in the patchable firmware source code image.

Figure 5:
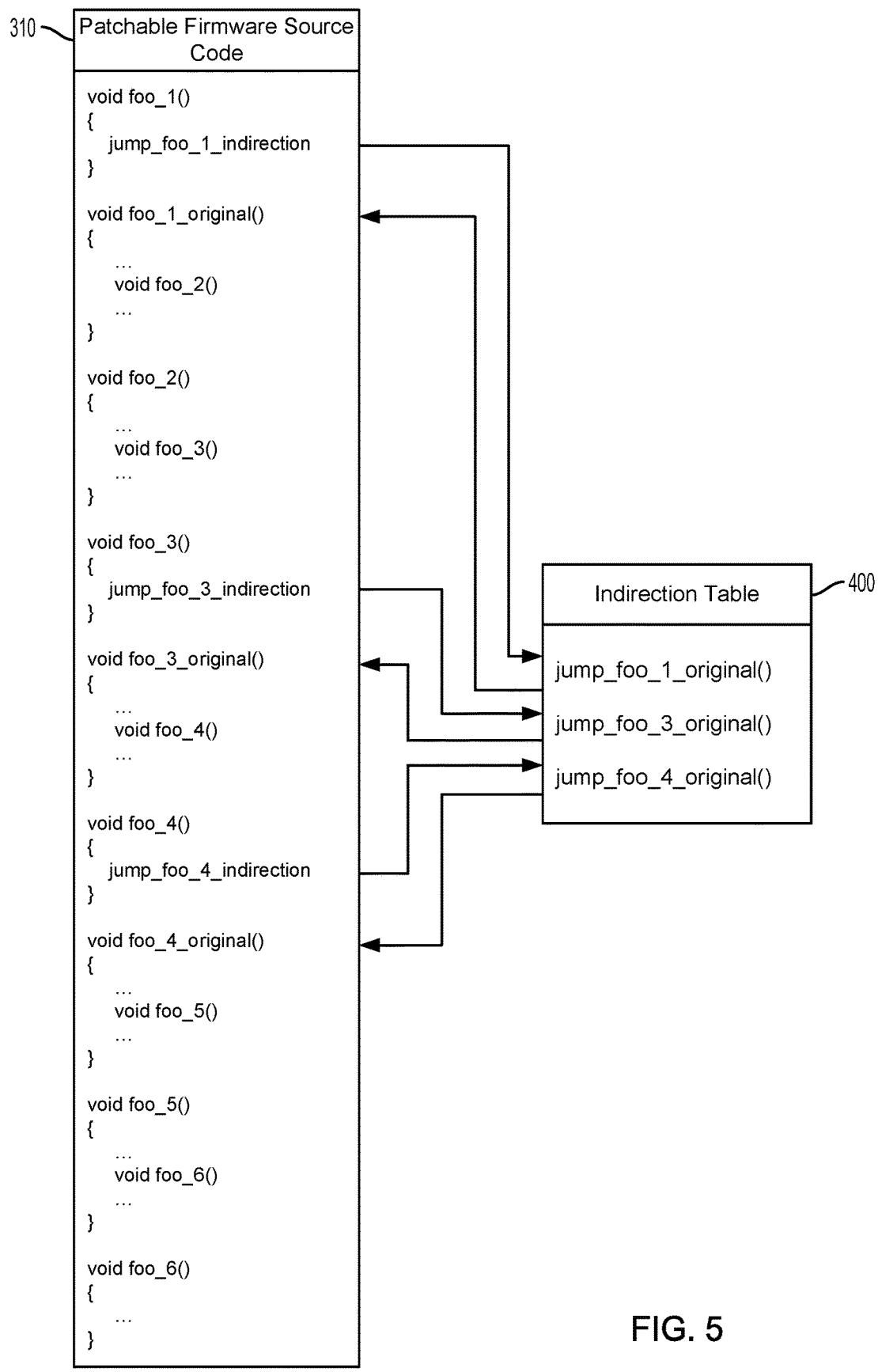
FIG. 5 is a block and flow diagram illustrating an example of execution calls between a patchable firmware source code and an indirection table for implementing various aspects.

FIG. 5 illustrates an example of execution calls between a patchable firmware source code and an indirection table for implementing various aspects. In various aspects, a patchable firmware source code image 310 may be compiled and/or stored to a ROM (e.g., ROM 232 in FIG. 2) of a computing device (e.g., computing device 10 in FIG. 1), and the indirection table 400 may be compiled and/or stored to a non-volatile memory (e.g., memory 16, 24 in FIG. 1, flash memory 234 in FIG. 2) of the computing device and loaded to a random access memory (e.g., random access memory 236 in FIG. 2) of a computing device. For ease of explanation, the example illustrated in FIG. 5 shows a version of high level source code, but is not intended to limit the descriptions or the claims. In the example illustrated in FIG. 5, execution of the patchable firmware source code image 310 may include execution of a patchable object, such as the patchable object "foo_1". Execution of a patchable object may include a call to the indirection table 400, such as "jump_foo_1_indirection." Execution of the patchable firmware source code image 310 may continue with execution of an instruction in the indirection table 400 to execute the patchable object in the patchable firmware source code image 310, such as "jump_foo_1_original( )". The execution of the patchable object in the patchable firmware source code image 310 may include a set of instructions, functions, and/or objects for execution, such as "foo_1_original( )" including "foo_2". Execution of the other patchable objects "foo_3" and "foo_4" may be similarly implemented. Execution of objects that are not patchable, such as "foo_2", "foo_5", and "foo_6", may be implemented without checking the indirection table 400.

Figure 6:
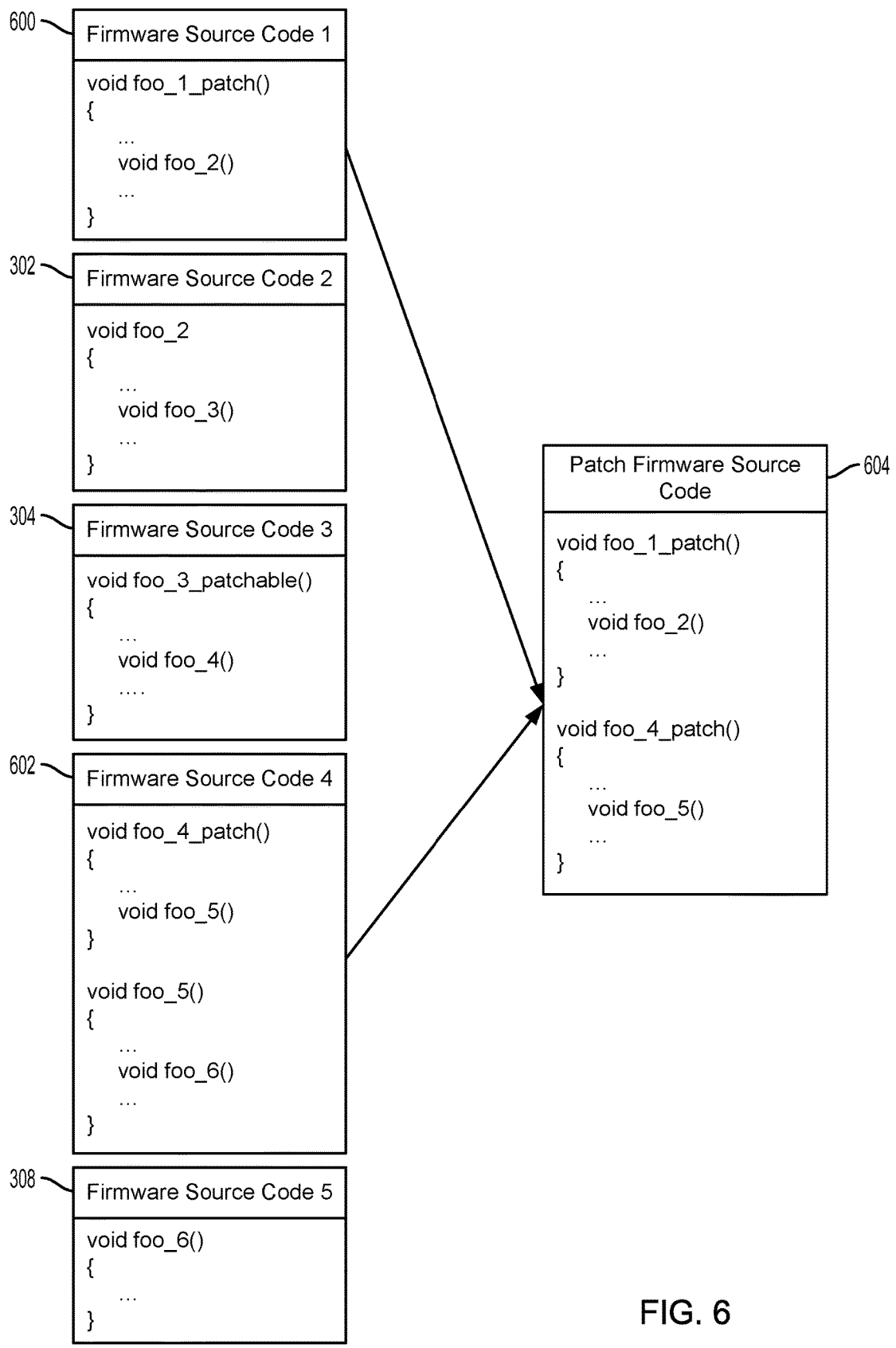
FIG. 6 is a block and flow diagram illustrating an example conversion of update firmware source code to patch firmware source code for implementing various aspects.

FIG. 6 illustrates an example of conversion of update firmware source code to patch firmware source code for implementing various aspects. The patchable firmware source code image cannot be altered to be updated once it is stored to a ROM (e.g., ROM 232 in FIG. 2) of the computing device (e.g., computing device 10 in FIG. 1). To update the patchable firmware source code image, a patch firmware source code image and patch indirection table may be loaded to the computing device by storing the image and table to a non-volatile memory (e.g., memory 16, 24 in FIG. 1, flash memory 234 in FIG. 2) of the computing device and loading the image and table to a random access memory (e.g., random access memory 326 in FIG. 2) of the computing device for execution.

To create the patch firmware source code image, update firmware source code files 600, 602 may be generated with altered versions of the patchable objects in the patchable firmware source code image. The update firmware source code files 600, 602 may include similarly named objects to corresponding patchable objects, but using a different symbol designated to indicate the object as a patch object rather than a patchable object as in the corresponding firmware source code files (e.g., firmware source code files 300, 306). Any character and/or combination of characters included in the name of the patch object that may be designated as a symbol used to identify a patchable object. In the example illustrated in FIG. 6, the symbol designated for use to identify a patch object is "_patch". In the update firmware source code 1 file 600, the "foo_1_patch" object name indicates that the "foo_1_patch" object is a patch object. Similarly, the "foo_4_patch" object name in the update firmware source code 4 file 602 is also indicated as a patch object. The "foo_2" object name in the firmware source code 2 file 302, the "foo_3_patchable" object name in the firmware source code 3 file 304, the "foo_5" object name in the firmware source code 4 file 306, and the "foo_6" object name in the firmware source code 5 file 308 do not contain symbols indicating the code objects as patch objects.

The firmware source code files 302, 306, 308 and the update firmware source code files 600, 602 may be converted to a patch firmware source code 604. To convert the firmware source code files 302, 306, 308 and the update firmware source code files 600, 602 to the patch firmware source code 604, an update firmware source code image may be generated by combining the firmware source code files 302, 306, 308 and the update firmware source code files 600, 602 and/or generating code for executing the firmware source code files 302, 306, 308 and the update firmware source code files 600, 602. The update firmware source code image may represent an execution order of the firmware source code files 302, 306, 308 and the update firmware source code files 600, 602.

The update firmware source code image may be analyzed to extract a list of patch objects from the update firmware source code image. In various aspects, extracting the list of patch objects may be accomplished by identifying the patch objects in the update firmware source code image and adding the patch objects to a list. Identifying the patch objects may be accomplished by searching the names of the objects in the update firmware source code image for symbols dedicated for indicating a patch object. In various aspects, the symbols dedicated for indicating a patch object may be provided in a symbol file from which the symbols may be read and used to direct the search for the symbols in the names of the objects in the update firmware source code image.

For patchable objects identified in the firmware source code image, the indirection table (e.g., indirection table 400 in FIG. 4) may be updated as a patch indirection table. Calls to patchable objects in the firmware source code image (e.g., firmware source code image 310) stored in the ROM corresponding to the patch objects in the update firmware source code image may be changed to calls to the patch objects in the patch firmware source code image 604 stored in the random access memory as described further herein.

The update firmware source code files 600, 602 that include patch objects and the calls in the patch indirection table to the patch objects in the patch firmware source code image 604 may be used to generate the patch firmware source code image 604. The patch firmware source code image 604 may be generated by identifying the objects in the firmware source code files 302, 306, 308 and the update firmware source code files 600, 602 that contain patch objects based on the entries in the patch indirection table indicating a call to the patch firmware source code image 604. The patch firmware source code image 604 may be generated by combining the update firmware source code files 600, 602, and/or by generating code for executing the update firmware source code files 600, 602. The patch firmware source code image 604 may represent an execution order of the update firmware source code files 600, 602. The patch firmware source code image 604 may be compiled and/or stored to a random access memory of a computing device.

Figure 7:
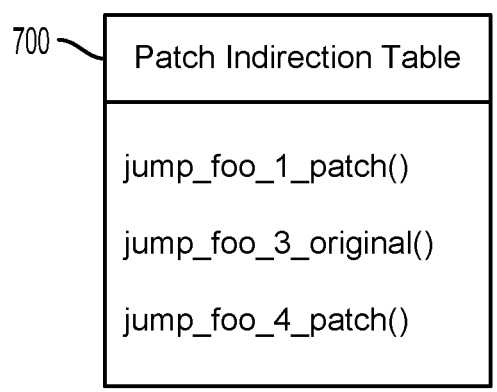
FIG. 7 is a block diagram illustrating an example patch indirection table for implementing various aspects.

FIG. 7 illustrates an example patch indirection table for implementing various aspects. A patch indirection table 700 may be generated using the indirection table (e.g., indirection table 400 in FIG. 4) and the patch firmware source code image (e.g., patch firmware source code image 604 in FIG. 6). In various aspects, the indirection table may be modified to become the patch indirection table 700 by changing the entries of the indirection table. Each call to the patch indirection table 700 for a patchable object in the patchable firmware source code image (e.g., patchable firmware source code image 310 in FIG. 3B) may include an entry in the patch indirection table 700. In various aspects, the patch indirection table 700 may be code based, and each entry in the patch indirection table 700 may contain an instruction, such as a "jump" instruction, either to the patchable object in the ROM (e.g., ROM 232 in FIG. 2) or the corresponding patch object in the random access memory (e.g., random access memory 236 in FIG. 2). In various aspects, the patch indirection table 700 may be data based, and each entry in the patch indirection table 700 may contain a designated data, such as zero (0), Null, or an address in the ROM, for the patchable objects that are not patched and an address in the random access memory for the patchable objects that are patched.

Continuing with the examples illustrated in FIG. 3B and FIG. 6, the example illustrated in FIG. 7 includes a patch indirection table 700 having entries for the call to the indirection table "jump_foo_1_indirection", "jump_foo_3_indirection", "jump_foo_4_indirection" in the patchable firmware source code image. The entries in the patch indirection table 700 may include calls to instances of the patchable objects not patched, such as "jump_foo_3_original( )", and calls to the patch objects corresponding to the patchable objects, such as "jump_foo_patch( )" and "jump_foo_4_patch( )".

Figure 8:
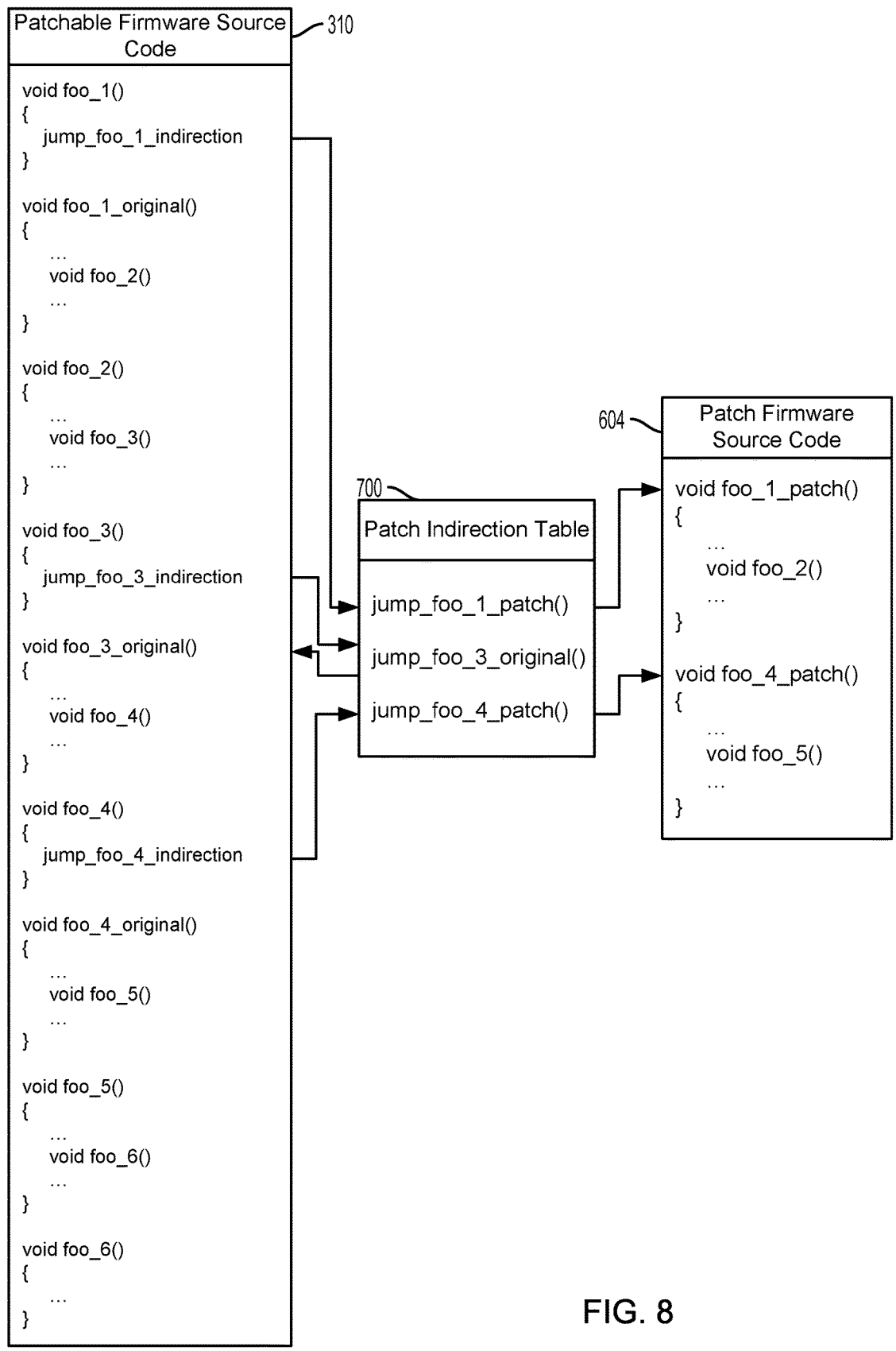
FIG. 8 is a block and flow diagram illustrating an example of execution calls between a patchable firmware source code, a patch indirection table, and a patch firmware source code for implementing various aspects.

FIG. 8 illustrates an example of execution calls between a patchable firmware source code, a patch indirection table, and a patch firmware source code for implementing various aspects. In various aspects, patchable firmware source code image 310 may be compiled and/or stored to a random access memory (e.g., ROM 232 in FIG. 2) of a computing device (e.g., computing device 10 in FIG. 1), and the patch indirection table 700 and the patch firmware source code image 604 may be compiled and/or stored to a non-volatile memory (e.g., memory 16, 24 in FIG. 1, flash memory 234 in FIG. 2) of the computing device and loaded to a random access memory (e.g., random access memory 236 in FIG. 2) of a computing device. For ease of explanation, the example illustrated in FIG. 7 shows version of high level source code, but is not intended to limit the descriptions or the claims. In the example illustrated in FIG. 8, execution of the patchable firmware source code image 310 may include execution of a patchable object, such as the patchable object "foo_1". Execution of a patchable object may include a call to the patch indirection table 700, such as "jump_foo_1_indirection." Execution of the patchable firmware source code image 310 may be diverted by execution of an instruction in the patch indirection table 700 to execute a patch object in the patch firmware source code image 604, such as "jump_foo_1_patch( )". The execution of the patch object in the patch firmware source code image 604 may include a set of instructions, functions, and/or objects for execution, such as "foo_1_patch( )" including "foo_2". Execution of the other patchable objects corresponding to patch objects in the patch firmware source code image 604, such as "foo_4" may be similarly implemented. Execution of patchable objects that do not correspond with a patch object in the patch firmware source code image 604, such as "foo_3", and execution of objects that are not patchable, such as "foo_2", "foo_5", and "foo_6", may be implemented as described herein with reference to FIG. 5.

Figure 9:
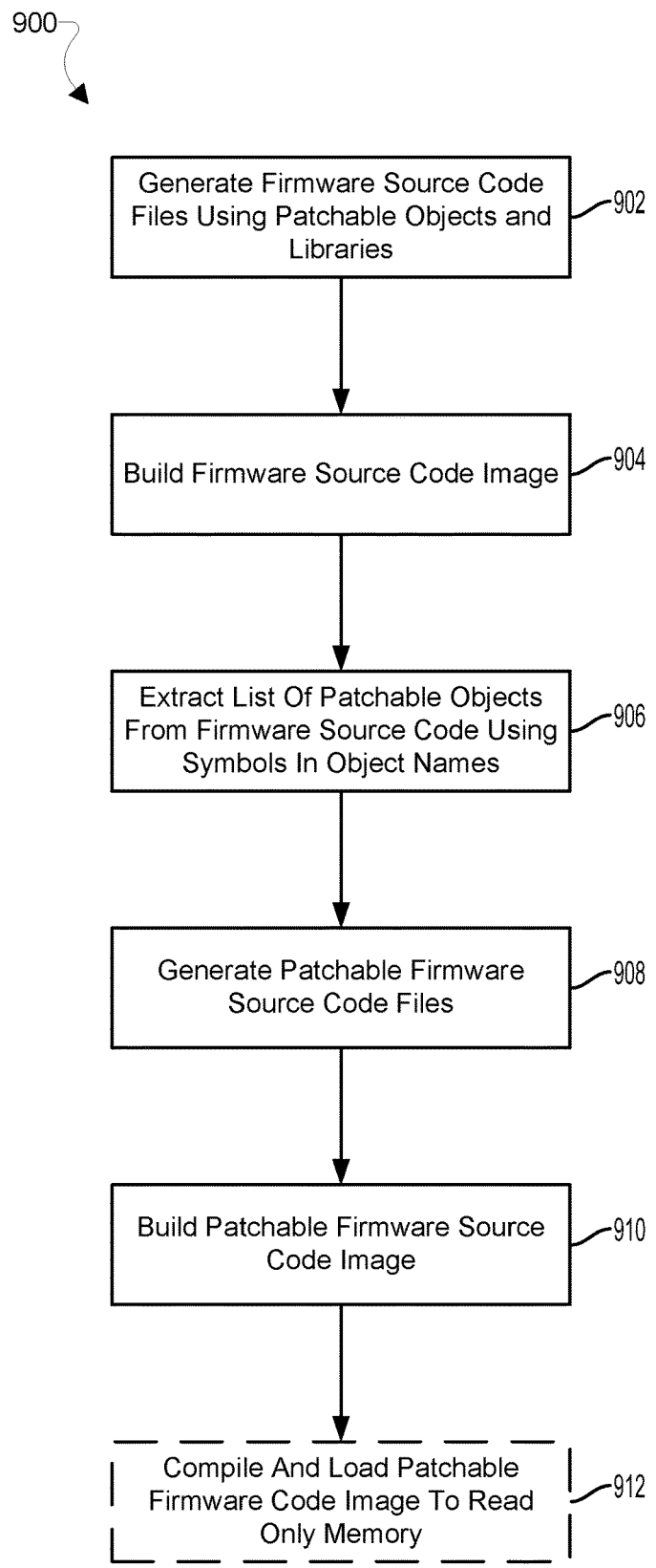
FIG. 9 is a process flow diagram illustrating a method for generating a patchable firmware source code according to an aspect.

FIG. 9 illustrates a method 900 for implementing generating a patchable firmware source code according to an aspect. The method 900 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, ROM 232, flash memory 234, and random access memory 236 in FIG. 2), and various memory/cache controllers. In order to encompass the alternative configurations enabled in various aspects, the hardware implementing the method 900 is referred to herein as a "processing device."

In block 902, the processing device may generate firmware source code files (e.g., firmware source code files 300, 302, 304, 306, 308 in FIGS. 3A, 3B, and 6) using patchable objects and patchable libraries. In various aspects, the processing device may generate the firmware source code files in response to inputs of a user of a computing device, such as a programmer, and/or a software program configured for programming firmware source code files. As discussed herein, the patchable objects belonging to patchable libraries may be configured to be identified as patchable objects based on symbols included in a name of a patchable object.

In block 904, the processing device may build a firmware source code image. To build a firmware source code image a firmware source code image may be generated by combining firmware source code files and/or generating code for executing the firmware source code files. The firmware source code image may represent an execution order of the firmware source code files.

In block 906, the processing device may extract a list of patchable objects from the firmware source code image using symbols in object names. The processing device may analyze the firmware source code image to extract a list of patchable objects from the firmware source code image. In various aspects, extracting the list of patchable objects may be accomplished by identifying the patchable objects in the firmware source code image and adding the patchable objects to a list. Identifying the patchable objects may be accomplished by searching the names of the objects in the firmware source code image for symbols dedicated for indicating a patchable object. In various aspects, the symbols dedicated for indicating a patchable object may be provided in a symbol file from which the symbols may be read and used to direct the search for the symbols in the names of the objects in the firmware source code image.

In block 908, the processing device may generate patchable firmware source code files (e.g., patchable firmware source code files 312, 314, 316 in FIGS. 3A and 3B). For patchable objects identified in the firmware source code image, the firmware source code files may be altered as patchable firmware source code files and/or patchable firmware source code files may be generated to include the injected code for the patchable object. The injected code may include calls to an indirection table and/or rename the object for directing execution of the firmware to the object in the firmware image stored in the ROM for an object that is not patched.

In block 910, the processing device may build a patchable firmware source code image (e.g., patchable firmware source code image 310, in FIGS. 3B, 5, and 8). The firmware source code files that do not include patchable objects, and the patchable firmware source code files that include injected code for the patchable objects may be used to generate a patchable firmware source code image. The patchable firmware source code image may be generated by combining the firmware source code files and the patchable firmware source code files, and/or by generating code for executing the firmware source code files and the patchable firmware source code files. The patchable firmware source code image may represent an execution order of the firmware source code files and the patchable firmware source code files.

In optional block 912, the processing device may compile and/or load the patchable firmware code image to a ROM.

Figure 10:
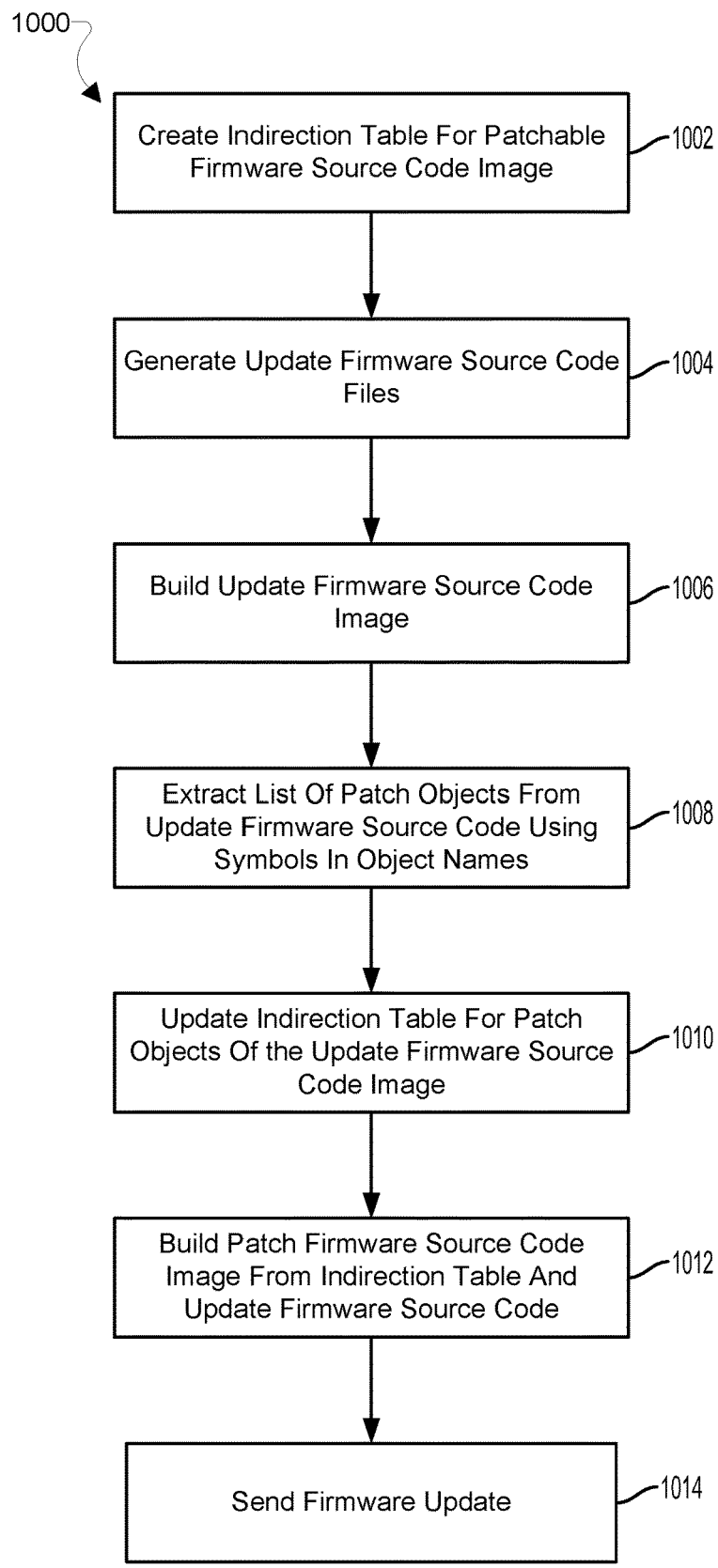
FIG. 10 is a process flow diagram illustrating a method for generating a patch firmware source code and patch indirection table according to an aspect.

FIG. 10 illustrates a method 1000 for implementing generating a patch firmware source code and patch indirection table according to an aspect. The method 1000 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, ROM 232, flash memory 234, and random access memory 236 in FIG. 2), and various memory/cache controllers. In order to encompass the alternative configurations enabled in various aspects, the hardware implementing the method 1000 is referred to herein as a "processing device."

In block 1002, the processing device may create an indirection table (e.g., indirection table 400 in FIGS. 4 and 5) for a patchable firmware source code image (e.g., patchable firmware source code image 310, in FIGS. 3B, 5, and 8). For each call to the indirection table for a patchable object in the patchable firmware source code image, the processing device may include an entry in the indirection table. In various aspects, the indirection table 400 may be code based, and including an entry in the indirection table 400 may include adding an instruction, such as a "jump" instruction to either the patchable object in the ROM or the corresponding patch object in the random access memory. In various aspects, the indirection table may be data based, and including an entry in the indirection table may include adding a designated data, such as zero (0), Null, or an address in the ROM, for the patchable objects that are not patched and an address in the random access memory for the patchable objects that are patched.

In block 1004, the processing device may generate update firmware source code files (e.g., updated firmware source code files 600 and 602 in FIG. 6). In various aspects, the processing device may generate the update firmware source code files in response to inputs of a user of a computing device, such as a programmer, and/or a software program configured for programming update firmware source code files.

In block 1006, the processing device may build an update firmware source code image. An update firmware source code image may be generated by combining the firmware source code files (e.g., firmware source code files 302, 306, 308 in FIGS. 3A, 3B, and 6) and the update firmware source code files, and/or generating code for executing the firmware source code files and the update firmware source code files. The update firmware source code image may represent an execution order of the firmware source code files and the update firmware source code files.

In block 1008, the processing device may extract a list of patch objects from the update firmware source code image using symbols in object names. The update firmware source code image may be analyzed to extract a list of patch objects from the update firmware source code image. In various aspects, extracting the list of patch objects may be accomplished by identifying the patch objects in the update firmware source code image and adding the patch objects to a list. Identifying the patch objects may be accomplished by searching the names of the objects in the update firmware source code image for symbols dedicated for indicating a patch object. In various aspects, the symbols dedicated for indicating a patch object may be provided in a symbol file from which the symbols may be read and used to direct the search for the symbols in the names of the objects in the update firmware source code image.

In block 1010, the processing device may update the indirection table for patch objects extracted from the update firmware source code image. A patch indirection table may be generated using the indirection table and the patch firmware source code image. In various aspects, the indirection table may be modified to become the patch indirection table by changing the entries of the indirection table. For each call to the patch indirection table for a patchable object in the patchable firmware source code image, the processing device may include an entry in the patch indirection table. In various aspects, the patch indirection table may be code based, and adding or modifying an entry in the patch indirection table by the processor may include adding or modifying an instruction, such as a "jump" instruction to either the patchable object in the ROM or the corresponding patch object in the random access memory. In various aspects, the patch indirection table may be data based, and adding or modifying an entry in the patch indirection table by the processor may include adding or modifying a designated data, such as zero (0), Null, or an address in the ROM, for the patchable objects that are not patched and an address in the random access memory for the patchable objects that are patched.

In block 1012, the processing device may build a patch firmware source code image (e.g., patch firmware source code image 604 in FIGS. 6 and 8) from the patch indirection table and the update firmware source code. The update firmware source code files that include patch objects and the calls in the patch indirection table to the patch objects in the patch firmware source code image may be used to generate the patch firmware source code image. The patch firmware source code image may be generated by identifying which of the objects in the firmware source code files and the update firmware source code files contain patch objects based on the entries in the patch indirection table indicating a call to the patch firmware source code image. The patch firmware source code image may be generated by combining the update firmware source code files, and/or by generating code for executing the update firmware source code files. The patch firmware source code image may represent an execution order of the update firmware source code files.

In block 1014, the processing device may send a firmware update of the patchable firmware source code image in the ROM by sending the patch source code image and the patch indirection table to a remote receiving computing device (e.g., computing device 10 in FIG. 1). The patch firmware source code image and the patch indirection table may be compiled and/or sent to the remote receiving computing device. The firmware update may be sent using various known channels and formats. For example, the firmware update may be sent using an over the air (OTA) firmware update in which the firmware update is sent via a network including a wireless portion connecting the processing device and the remote receiving computing device. Such a firmware update may include sending a firmware update by a firmware update sender, such as a manufacture of the remote receiving computing device or a component of the remote receiving computing device, a service provider, and/or a vendor, via a wired and/or wireless connection. Firmware updates may be used by a manufacture of the remote receiving computing device or a component of the remote receiving computing device, a service provider, and/or a vendor to correct a bug in the firmware stored in a ROM of the remote receiving computing device and/or to provide new and/or updated functionally and/or control of programmable hardware of the remote receiving computing device as defined in the firmware stored in the ROM.

In various aspects firmware images of a firmware update may include patch firmware source code images, which may include altered versions of any number and/or portion of the patchable firmware code images stored in the ROM of the remote receiving computing device. A firmware update may also include a patch indirection table that may be stored to a flash memory of the remote receiving computing device and configured to guide the execution of a firmware between execution of the patchable firmware source code images stored in the ROM of the remote receiving computing device and/or the patch firmware source code images, which may be stored in the flash memory and loaded to a random access memory of the remote receiving computing device for execution as described herein.

Figure 11:
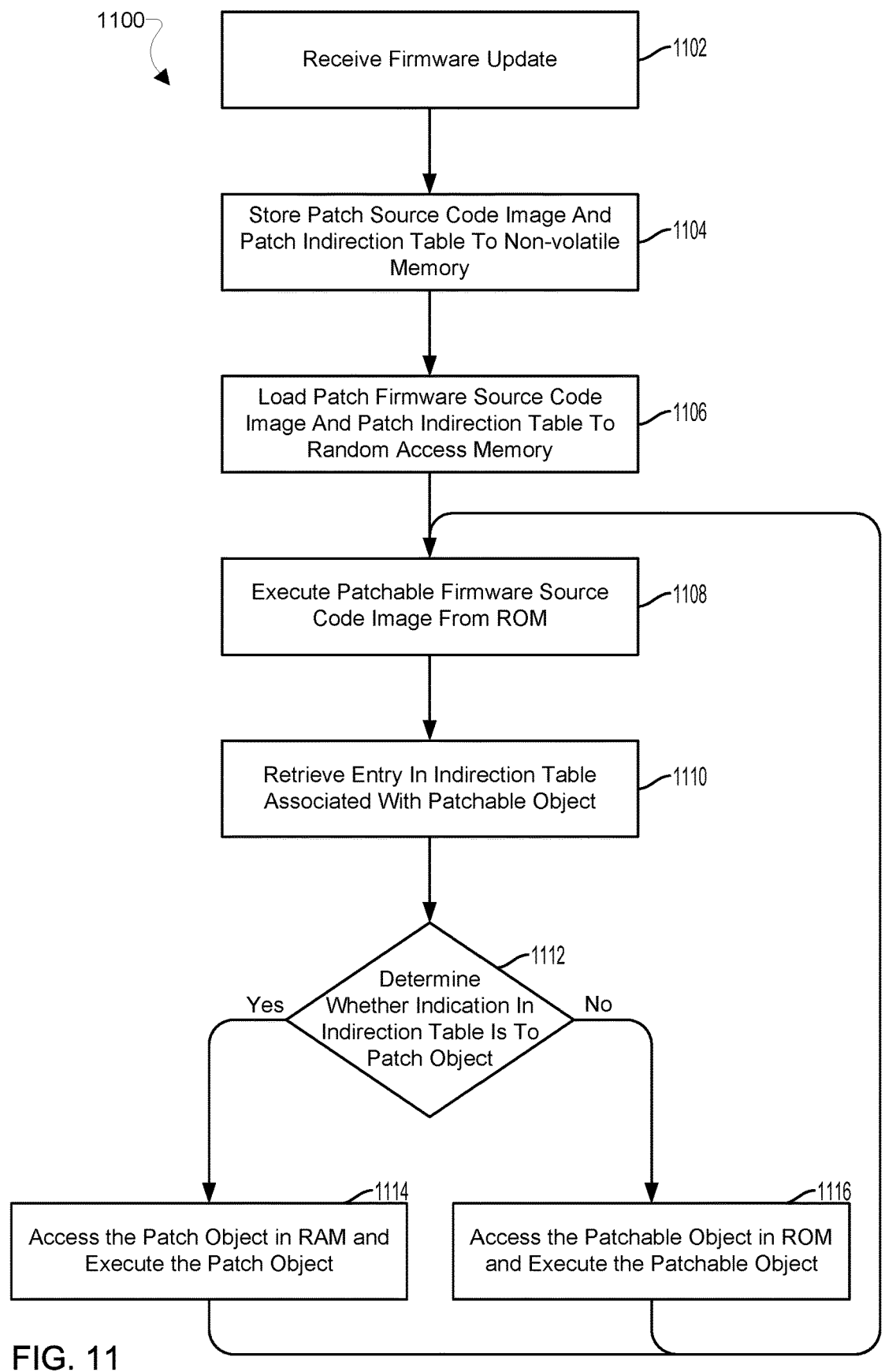
FIG. 11 is a process flow diagram illustrating a method for updating source code and a patch indirection table according to an aspect.

FIG. 11 illustrates a method 1100 for updating firmware source code and a patch indirection table according to an aspect. The method 1100 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within a computing device boot system that includes other individual components (e.g., memory 16, 24 in FIG. 1, ROM 232, flash memory 234, and random access memory 236 in FIG. 2), and various memory/cache controllers. In order to encompass the alternative configurations enabled in various aspects, the hardware implementing the method 1100 is referred to herein as a "processing device."

In block 1102, the processing device may receive a firmware update. The firmware of a computing device may be received via various known channels and formats, for example, in an over the air (OTA) firmware update received via a wired or wireless network. Such a firmware update may include receiving updated firmware from the remote sending computing of a firmware update sender, such as a manufacture of a computing device or a component of the computing device, a service provider, and/or a vendor. In various aspects, firmware images of a firmware update may include patch firmware source code images, which may include altered versions of any number and/or portion of the patchable firmware code images stored in the ROM of the computing device. A firmware update may also include a patch indirection table that may be stored to the flash memory of the computing device and configured to guide the execution of firmware between execution of the patchable firmware source code images stored in the ROM and/or the patch firmware source code images, which may be stored in the flash memory and loaded to a random access memory of the computing device for execution.

In block 1104, the processing device may store the patch source code image and the patch indirection table to a non-volatile memory, such as the flash memory and/or a storage memory. The patch firmware source code image and the patch indirection table may be compiled and/or stored to the non-volatile memory.

In block 1106, the processing device may also load the patch firmware source code image and the patch indirection table to the random access memory for execution of the update of the patchable firmware source code image in the ROM. The processing device may load the patch source code image and the patch indirection table from the non-volatile memory.

In block 1108, the processing device may execute the patchable firmware source code image in the ROM. In various aspects, the processing device may execute objects of the patchable firmware source code image in a sequential order. During execution of the patchable firmware source code image, the processing device may encounter a patchable object including a call to the indirection table loaded to the random access memory.

In block 1110, the processing device may retrieve an entry in the indirection table associated with the patchable object. In various aspects, the call to the indirection table may include a jump to an address in the indirection table associated with the patchable object and/or instructions to access and search the indirection table for the entry associated with the patchable function. For jumps to an address in the indirection table, the address in the indirection table may be a location in the indirection table having an indication as to whether to execute the patchable object in the ROM or a patch object in the random access memory. For access and search instructions, the processing device may search for symbols, such as a symbol from the name of the patchable object, in the indirection table indicating that the entry is associated with the patchable function, and such an entry may include an indication as to whether to execute the patchable object in the ROM or a patch object in the random access memory.

In determination block 1112, the processing device may determine whether the indication in the indirection table indicates that the processing device should execute the patch object in the random access memory, such as a call to the patch object in the random access memory. In various aspects, the indication in the indirection table may include an address for the processing device to jump to in the ROM for the call to the patchable object and/or an address for the processing device to jump to in the random access memory for the call to the patch object associated with the patchable object. In various aspects, the indication in the indirection table may include a call to the patchable object in the ROM and/or a call to the patch object in the random access memory associated with the patchable object.

In response to determining that the indication in the indirection table indicates that the processing device should execute the patch object in the random access memory (i.e., determination 1112="Yes"), the processing device may access the patch object in the random access memory and execute the patch object in block 1114. In various aspects, the patch object may call back to the next object in the ROM after the patchable object with which the patch object is associated. The processing device may continue to execute the execute the patchable firmware source code image in the ROM in block 1108.

In response to determining that the indication in the indirection table does not indicate execution of a patch object in the random access memory (i.e., determination 1112="No"), the processing device may access the patchable object in the ROM and execute the patchable object in block 1116. The processing device may continue to execute the execute the patchable firmware source code image in the ROM in block 1108.

Figure 12:
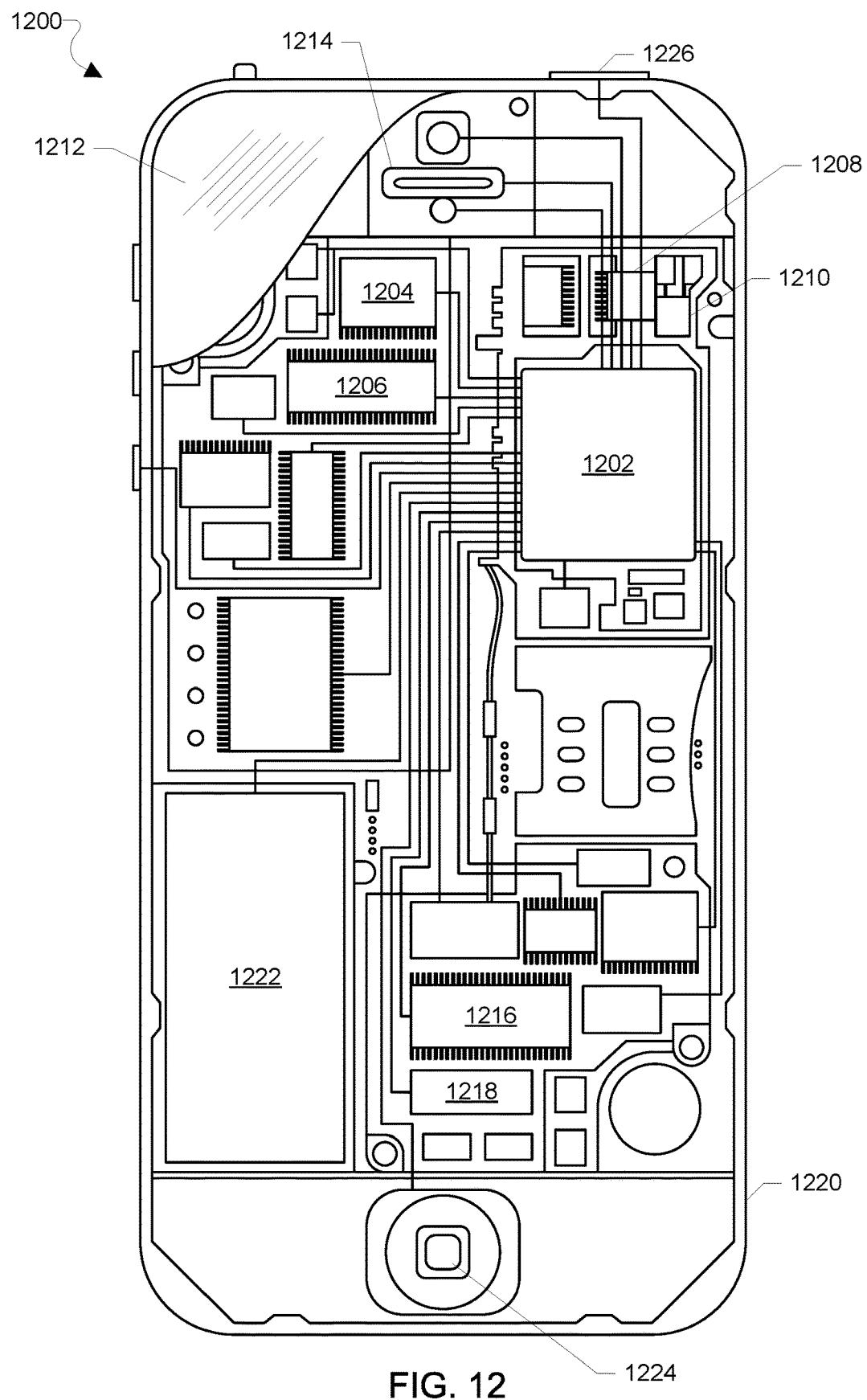
FIG. 12 is a component block diagram illustrating an example mobile computing device suitable for use with the various aspects.

The various aspects (including, but not limited to, aspects described above with reference to FIGS. 1-11) may be implemented in a wide variety of computing systems including mobile computing devices, an example of which suitable for use with the various aspects is illustrated in FIG. 12. The mobile computing device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the computing device 1200 need not have touch screen capability.

The mobile computing device 1200 may have one or more radio signal transceivers 1208 (e.g., Peanut, Bluetooth, ZigBee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The mobile computing device 1200 may include a cellular network wireless modem chip 1216 that enables communication via a cellular network and is coupled to the processor.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as Universal Serial Bus (USB), FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components described herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
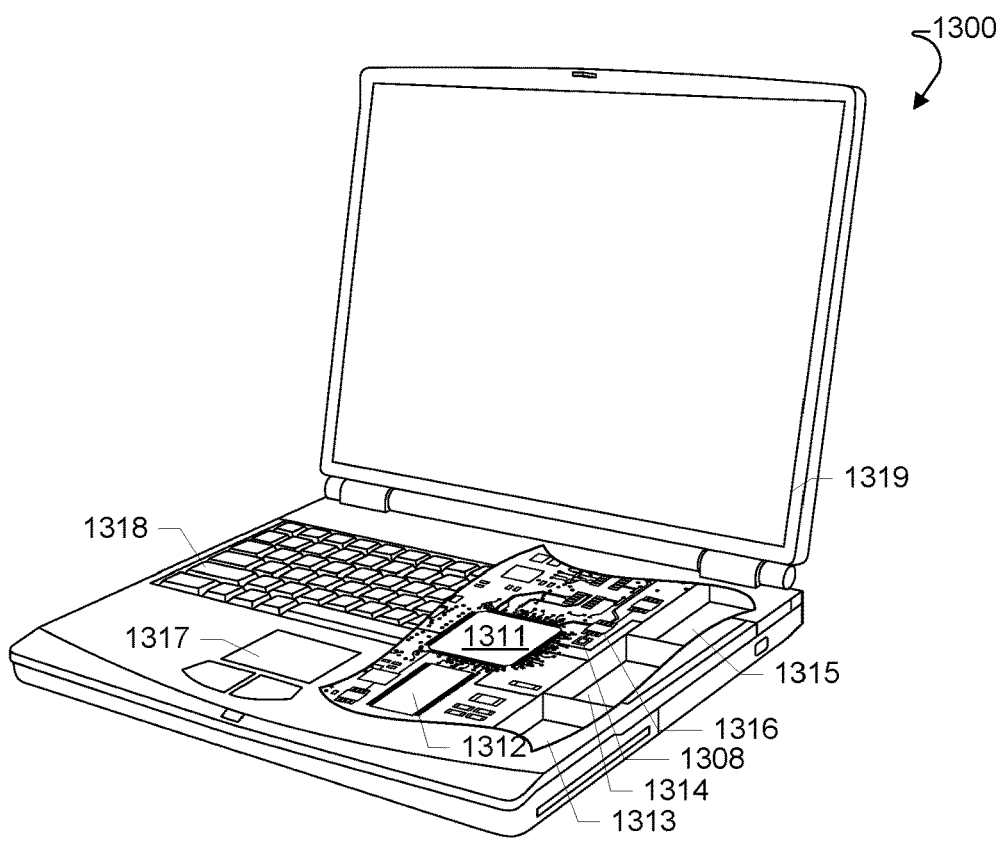
FIG. 13 is a component block diagram illustrating an example mobile computing device suitable for use with the various aspects.

The various aspects (including, but not limited to, aspects described above with reference to FIGS. 1-11) may be implemented in a wide variety of computing systems include a laptop computer 1300 an example of which is illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with the various aspects.

Figure 14:
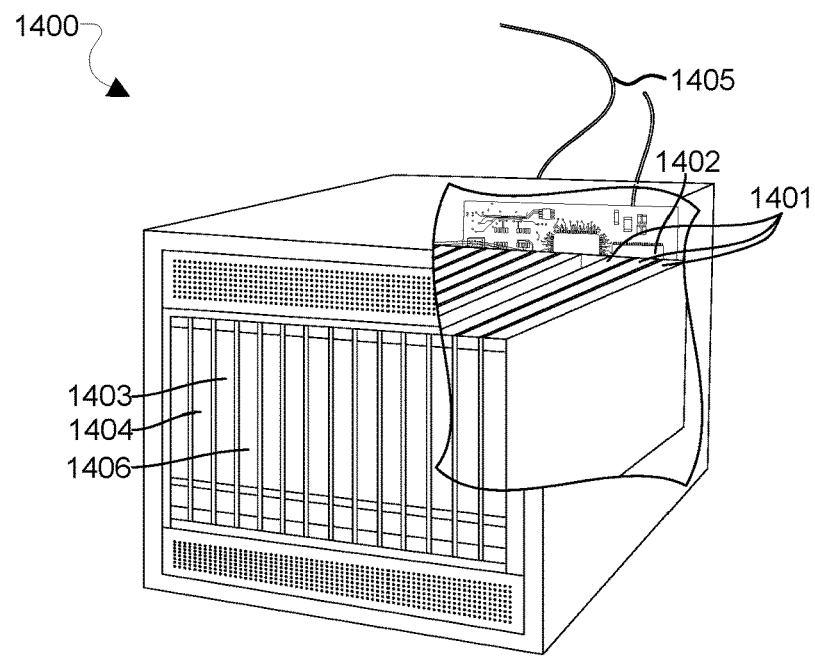
FIG. 14 is a component block diagram illustrating an example server suitable for use with the various aspects.

The various aspects (including, but not limited to, aspects described above with reference to FIGS. 1-11) may also be implemented in fixed computing systems, such as any of a variety of commercially available servers. An example server 1400 is illustrated in FIG. 14. Such a server 1400 typically includes one or more multicore processor assemblies 1401 coupled to volatile memory 1402 and a large capacity nonvolatile memory, such as a disk drive 1404. As illustrated in FIG. 14, multicore processor assemblies 1401 may be added to the server 1400 by inserting them into the racks of the assembly. The server 1400 may also include a floppy disc drive, compact disc (CD) or digital versatile disc (DVD) disc drive 1406 coupled to the processor 1401. The server 1400 may also include network access ports 1403 coupled to the multicore processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of implementing a patch infrastructure on a computing device for firmware stored in read only memory (ROM) on a remote receiving computing device, comprising:
   identifying, by a processor of the computing device, a patchable object from a firmware source code image based on a symbol designated to indicate the patchable object in a name of the patchable object;
   generating, by the processor, a patchable firmware source code file by injecting source code including a first call to the patchable object configured to call to an indirection table and a second call to the patchable object configured to execute the patchable object;
   building, by the processor, a patchable firmware source code image from a plurality of patchable firmware source code files including the patchable firmware source code file, wherein the patchable firmware source code image includes the first call to the patchable object and the second call to the patchable object;
   creating, by the processor, the indirection table including an entry for the first call to the patchable object from the patchable firmware source code image having an indication to implement the second call to the patchable object in the patchable firmware source code image;
   identifying, by the processor, a patch object from an update firmware source code image based on a symbol designated to indicate the patch object in a name of the patch object, wherein the patch object corresponds to the patchable object; and
   updating, by the processor, the entry for the first call to the patchable object in the indirection table by replacing the indication to implement the second call to the patchable object with an indication to implement a call to the patch object.

2. The method of claim 1, further comprising:
   building, by the processor, the update firmware source code image from at least one update firmware source code file having the patch object; and
   building, by the processor, a patch firmware source code image from the at least one update firmware source code file and the updated indirection table, wherein the patch firmware source code image includes the call to the patch object.

3. The method of claim 2, further comprising sending, by the processor, a firmware update of the patchable firmware source code image including the indirection table and the patch firmware source code image to the remote receiving computing device.

4. The method of claim 3, wherein sending the firmware update comprises sending, by the processor, the firmware update as an over the air (OTA) update.

5. The method of claim 1, wherein replacing the indication to implement the second call to the patchable object with the indication to implement the call to the patch object comprises:
   replacing, by the processor, the indication to implement the second call to the patchable object from the ROM with the indication to implement the call to the patch object from a random access memory (RAM) of the remote receiving computing device.

6. The method of claim 5, wherein:
   the indication to implement the second call to the patchable object in the patchable firmware source code image comprises at least one of:
      an address for the patchable object in the ROM; or
      an instruction to implement the patchable object from the ROM; and
   the indication to implement the call to the patch object from the RAM comprises at least one of:
      an address for the patch object in the RAM; or
      an instruction to implement the patch object from the RAM.

7. The method of claim 1, further comprising:
   generating a firmware source code file including a third call to the patchable object; and
   building, by the processor, the firmware source code image from a plurality of firmware source code files including the firmware source code file.

8. A method of implementing a firmware update for a patchable firmware source code image stored in read only memory (ROM) on a computing device, comprising:
   receiving, by a processor of the computing device, the firmware update for the patchable firmware source code image including a patch indirection table and a patch firmware source code image;
   loading, by the processor, the patch indirection table and the patch firmware source code image to a random access memory (RAM) of the computing device;
   executing, by the processor, the patchable firmware source code image including executing a first call to a patchable object having a call to the patch indirection table;
   retrieving, by the processor, an entry of the patch indirection table associated with the patchable object;
   determining, by the processor, whether the entry includes an indication to execute a call to a patch object from the RAM, wherein the indication to execute the call to the patch object includes at least one of:
      an address for the patch object in the RAM; or
      an instruction to implement the patch object from the RAM;
   determining, by the processor, that the entry includes an indication to execute a second call to the patchable object in the patchable firmware source code image in response to determining that the entry does not include the indication to execute the call to the patch object from the RAM, wherein the indication to execute the second call to the patchable object includes at least one of:
      an address for the patchable object in the ROM; or
      an instruction to implement the patchable object from the ROM.

9. The method of claim 8, further comprising storing, by the processor, the patch indirection table and the patch firmware source code image to a non-volatile memory of the computing device,
wherein loading the patch indirection table and the patch firmware source code image to the RAM comprises loading, by the processor, the patch indirection table and the patch firmware source code image from the non-volatile memory.

10. The method of claim 8, further comprising in response to determining that the entry includes the indication to execute the call to the patch object:
accessing, by the processor, the patch object in the RAM; and
executing the patch object by the processor.

11. The method of claim 8, further comprising in response to determining that the entry does not include the indication to execute the call to the patch object:
accessing, by the processor, the second call to the patchable object; and
executing the patchable object by the processor.

12. The method of claim 8, wherein receiving the firmware update for the patchable firmware source code image comprises receiving, by the processor, the firmware update as an over the air (OTA) update.

13. A computing device, comprising:
a processing device configured to perform operations comprising:
identifying a patchable object from a firmware source code image based on a symbol designated to indicate the patchable object in a name of the patchable object;
generating a patchable firmware source code file by injecting source code including a first call to the patchable object configured to call to an indirection table and a second call to the patchable object configured to execute the patchable object;
building a patchable firmware source code image from a plurality of patchable firmware source code files including the patchable firmware source code file, wherein the patchable firmware source code image includes the first call to the patchable object and the second call to the patchable object;
creating the indirection table including an entry for the first call to the patchable object from the patchable firmware source code image having an indication to implement the second call to the patchable object in the patchable firmware source code image;
identifying a patch object from an update firmware source code image based on a symbol designated to indicate the patch object in a name of the patch object, wherein the patch object corresponds to the patchable object; and
updating the entry for the first call to the patchable object in the indirection table by replacing the indication to implement the second call to the patchable object with an indication to implement a call to the patch object.

14. The computing device of claim 13, wherein the processing device is configured to perform operations further comprising:
building the update firmware source code image from at least one update firmware source code file having the patch object; and
building a patch firmware source code image from the at least one update firmware source code file and the updated indirection table, wherein the patch firmware source code image includes the call to the patch object.

15. The computing device of claim 14, wherein the processing device is configured to perform operations further comprising sending a firmware update of the patchable firmware source code image including the indirection table and the patch firmware source code image to a remote receiving computing device.

16. The computing device of claim 15, wherein the processing device is configured to perform operations such that sending the firmware update comprises sending the firmware update as an over the air (OTA) update.

17. The computing device of claim 13, wherein the processing device is configured to perform operations such that replacing the indication to implement the second call to the patchable object with the indication to implement the call to the patch object comprises replacing the indication to implement the second call to the patchable object from a read only memory (ROM) of a remote receiving computing device having the patchable firmware source code image stored in the ROM with the indication to implement the call to the patch object from a random access memory (RAM) of the remote receiving computing device.

18. The computing device of claim 17, wherein:
the indication to implement the second call to the patchable object in the patchable firmware source code image comprises at least one of:
an address for the patchable object in the ROM; or
an instruction to implement the patchable object from the ROM; and
the indication to implement the call to the patch object from the RAM comprises at least one of:
an address for the patch object in the RAM; or
an instruction to implement the patch object from the RAM.

19. The computing device of claim 13, wherein the processing device is configured to perform operations further comprising:
generating a firmware source code file including a third call to the patchable object; and
building the firmware source code image from a plurality of firmware source code files including the firmware source code file.

20. A computing device, comprising:
a random access memory (RAM) configured to store a patch indirection table and a patchable firmware source code image;
a read only memory (ROM); and
a processor configured to perform operations comprising:
receiving a firmware update for the patchable firmware source code image including the patch indirection table and the patch firmware source code image;
loading the patch indirection table and the patch firmware source code image to the RAM;
executing the patchable firmware source code image including executing a first call to a patchable object having a call to the patch indirection table;
retrieving an entry of the patch indirection table associated with the patchable object;
determining whether the entry includes an indication to execute a call to a patch object from the RAM, wherein the indication to execute the call to the patch object includes at least one of:
an address for the patch object in the RAM; or
an instruction to implement the patch object from the RAM;

determining that the entry includes an indication to execute a second call to the patchable object in the patchable firmware source code image in response to determining that the entry does not include the indication to execute the call to the patch object from the RAM, wherein the indication to execute the second call to the patchable object includes at least one of:
an address for the patchable object in the ROM; or
an instruction to implement the patchable object from the ROM.

21. The computing device of claim 20, wherein the processor is configured to perform operations further comprising storing the patch indirection table and the patch firmware source code image to a non-volatile memory of the computing device, and
wherein the processor is configured to perform operations such that loading the patch indirection table and the patch firmware source code image to the RAM comprises loading the patch indirection table and the patch firmware source code image from the non-volatile memory.

22. The computing device of claim 20, wherein the processor is configured to perform operations further comprising:
accessing the patch object in the RAM in response to determining that the entry includes the indication to execute the call to the patch object; and
executing the patch object.

23. The computing device of claim 20, wherein the processor is configured to perform operations further comprising:
accessing the second call to the patchable object in response to determining that the entry does not include the indication to execute the call to the patch object; and
executing the second call to the patchable object.

24. The computing device of claim 20, wherein the processor is configured to perform operations such that receiving the firmware update for the patchable firmware source code image comprises receiving the firmware update as an over the air (OTA) update.

* * * * *